United States Patent [19]

Jayne

[11] 4,099,688
[45] Jul. 11, 1978

[54] RUNWAY SANDER

[76] Inventor: Murray Lawrence Jayne, 1906 NE. River Ct., Jensen Beach, Fla. 33457

[21] Appl. No.: 729,486

[22] Filed: Oct. 4, 1978

[51] Int. Cl.² .................... B64D 47/00; B60B 39/08
[52] U.S. Cl. .................... 244/103 R; 137/74; 222/193; 244/136; 291/3
[58] Field of Search .......... 222/3, 4, 54, 394, 373, 222/399, 541, 562, 563, 193; 291/1, 3, 13, 20, 25, 38, 41, 46, 48, 11 R, 11 A; 244/100 R, 103 R, 136; 137/13, 72, 73, 74; 220/89 A, 89 B

[56] References Cited

U.S. PATENT DOCUMENTS

| | | | |
|---|---|---|---|
| 2,282,185 | 5/1942 | Havill | 291/3 |
| 2,324,274 | 7/1943 | Baldwin | 291/3 |
| 2,498,164 | 2/1950 | Hunziker | 291/3 |
| 3,182,934 | 5/1965 | Clark | 244/103 R |
| 3,235,126 | 2/1966 | Shay | 222/193 X |
| 3,367,233 | 2/1968 | Silverschotz | 220/89 A X |
| 3,624,793 | 11/1971 | Marand | 222/193 X |
| 3,822,895 | 7/1974 | Ochiai | 137/72 X |
| 3,889,991 | 6/1975 | Hewitt | 291/3 X |
| 3,952,543 | 4/1976 | Buller | 137/74 X |
| 3,987,937 | 10/1976 | Coucher | 222/193 |

FOREIGN PATENT DOCUMENTS

| | | | |
|---|---|---|---|
| 466,718 | 10/1926 | Fed. Rep. of Germany | 291/3 |
| 456,878 | 8/1926 | Fed. Rep. of Germany | 291/3 |

Primary Examiner—Galen L. Barefoot

[57] ABSTRACT

This invention relates to aircraft and particularly to the landing gear, and specifically to a device for promptly sanding an unexpectedly slippery runway as the aircraft is in the process of landing thereon so that the aircraft can be controlled and safely stopped after it is on the ground.

5 Claims, 6 Drawing Figures

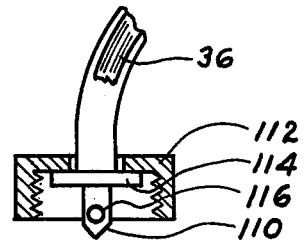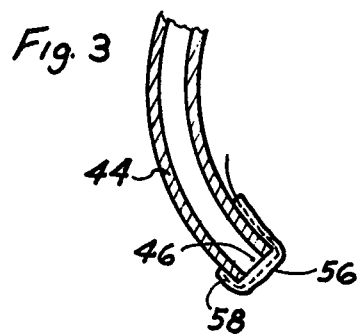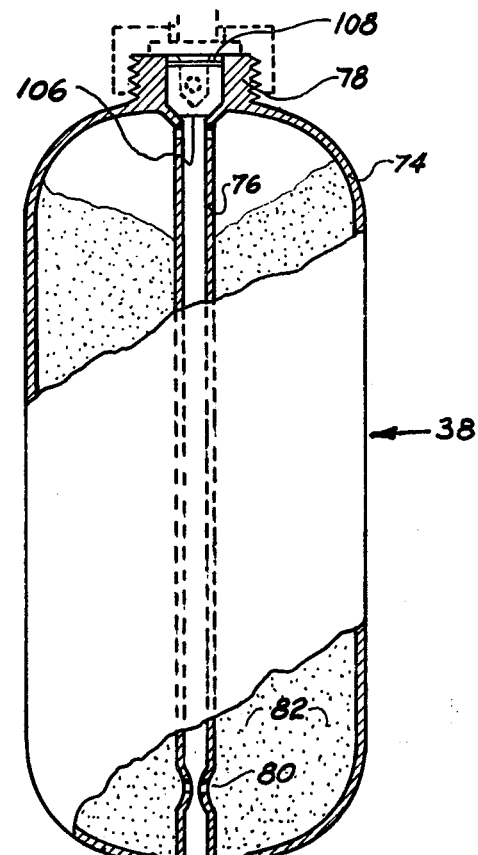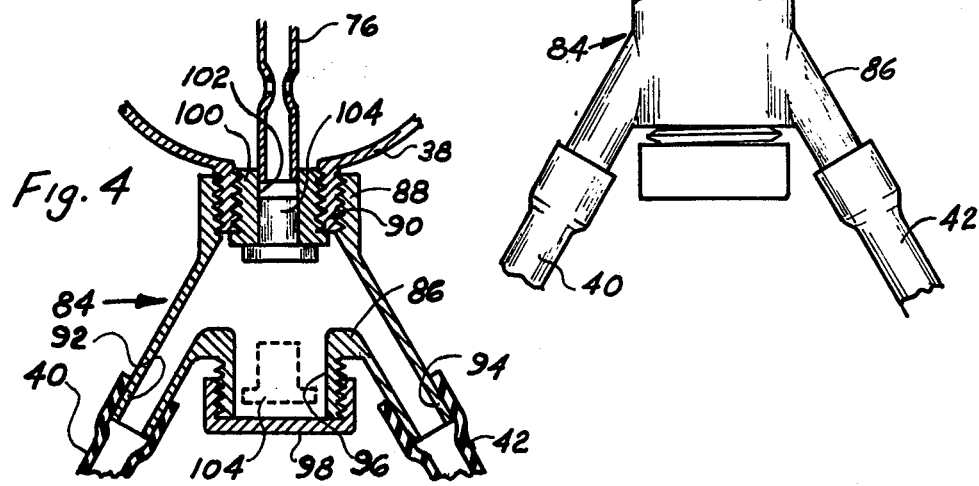

RUNWAY SANDER

BACKGROUND OF THE INVENTION

Sanding devices similar to those on railroad locomotives have been installed on aircraft, but experience has shown that the sand is often damp and frozen when needed so that the outlets are clogged and the device are useless. The present invention contemplates a device which is hermetically sealed until the moment of use so that there is no possibility of the aggregate's being frozen or caked, and it will be projected dependably when called for by the pilot.

BRIEF DESCRIPTION OF THE INVENTION

In the practice of the invention a fluid-tight sand reservoir adapted to be pressurized is installed on some suitable part of the aircraft and has a system including one or more discharge openings which are sealed until the moment of use. When the device is needed the seals are disabled and the reservoir is pressurized so that the gritty aggregate is propelled by the pressure fluid onto the runway in the path of the landing wheels, so that the aircraft can be brought to a stop.

The reservoir, after use is recharged under controlled conditions as a service operation, so that the aggregate will be dry, and not caked or frozen when needed.

The device might alternatively be furnished in the form of units carried directly on the wheel-struts, and which would be discarded after use and replaced with fresh ones.

A principal object of the invention is to provide a runway sanding device having the above described characteristics and advantages.

Further objects and advantages will become apparent from the following description and accompanying drawings in which;

BRIEF DESCRIPTON OF THE DRAWINGS

FIG. 2 is a partial vertical axial sectional view of a reservoir indicated in FIG. 1;

FIG. 3 is a vertical axial sectional view of a detail indicated in FIG. 1;

FIG. 4 is a vertical axial sectional view of a detail indicated in FIG. 2;

Similar reference characters have been applied to the same parts throughout the drawings and specification.

DETAILED DESCRIPTION OF THE PREFERRED EMBODIMENTS

Figure 1:
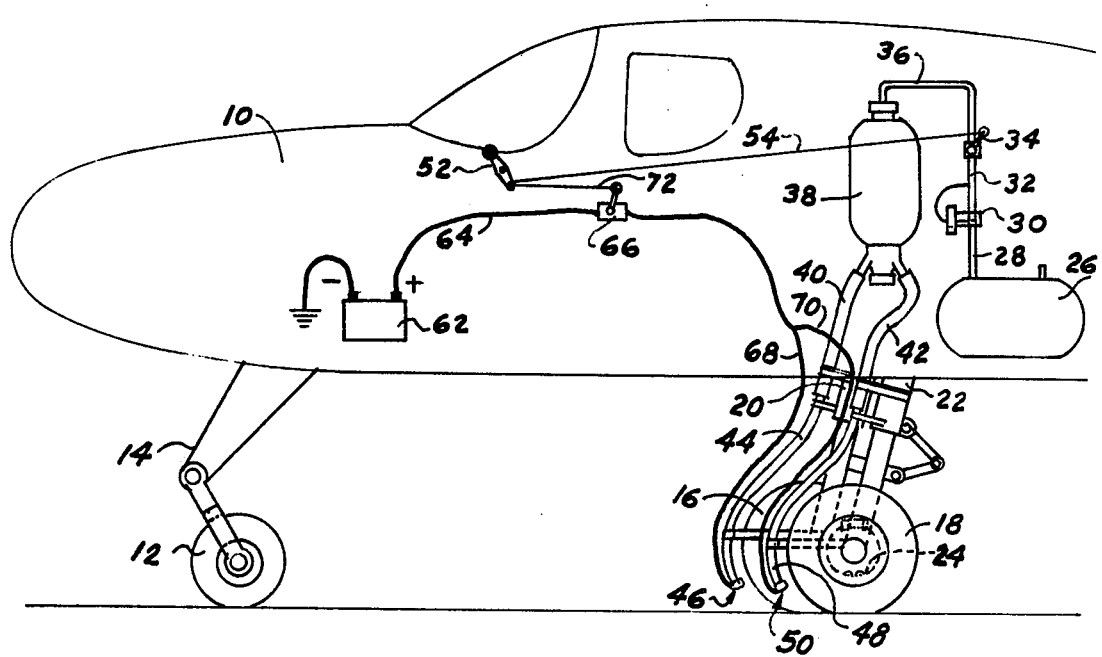
FIG. 1 is a left side elevation of an aircraft with parts omitted to show the invention installed therein.

Referring to FIG. 1, the aircraft has a fuselage 10 and the usual wings, power plant and tail, not necessary to show and describe for an understanding of the invention, and a nose wheel 12 journaled on a strut 14 joined to fusilage 10 in any usual or suitable manner, and a pair of landing wheels 16 and 18 journaled on struts 20 and 22 joined to fusilage 10 in any usual or suitable manner, wheels 16 and 18 being equipped with brakes as 24 of well-known type for controlling the aircraft on the ground. As is well-known, if the runway is icy or slippery for any reason the brakes will be ineffective, or if one wheel is on ice while the other is on dry pavement or the like, they will cause the aircraft to swerve off course and possibly cause an accident.

The embodiment of the invention shown in FIG. 1 comprises a source of pressure fluid 26 carried on the aircraft and connected by a pipe 28 to a pressure reducing valve 30 of well-known type, in turn connected by a pipe 32 to a shut-off valve 34. Valve 34 is connected by a pipe 36 to a reservoir 38 which will be further described, containing the gritty aggregate or sand. Pipes 40 and 42, preferably of flexible character, lead from reservoir 38, pipe 40 connecting to a relatively rigid discharge pipe 44 fixed in any suitable manner to strut 20 and terminating at an outlet opening 46 aimed in a manner to direct the discharged material between the runway and wheel 16. In like manner pipe 42 connects with a rigid pipe 48 fixed to strut 22, and having an outlet 50 aimed to discharge material between the runway and wheel 18.

Valve 34 is controlled by a lever 52 connected to valve 34 by a suitable link or wire 54. If the pilot finds that his brakes make the wheels slip, he can pull the lever 52 and instantly spray sand under them, thereby developing enough traction for a safe stop.

A serious problem in prior devices of this type is dampness and freezing of the sand, and for this reason pipes 44 and 48 each have a fusible or suitable seal as 56, FIG. 3, in the present instance containing an electrical resistance wire 58 which may be energized by the pilot to melt the seal, which is immediately blown away from outlet 46 by the fluid pressure to provide free spraying of the sand. An identical seal is fixed on pipe 48.

The aircraft battery 62 is connected by a wire 64 to a switch 66 and by wires 68 and 70 to the resistance wire 58 in seal 56 and the corresponding wire in the seal on pipe 48. Switch 66 is operated from lever 52 by a link 72. Thus when lever 52 is actuated it will pressurize reservoir 38 and at the same time disable the seals on outlets 46 and 50.

Reservoir 38, as more particularly shown in FIG. 2, comprises an outer pressure resisting shell 74 having a draft tube 76 fixed in fluid-tight manner to shell 74 and to a nipple 78 for connection to above mentioned pipe 36. Tube 76 near its lower end is contracted to form a "venturi" and has one or more ports 80 through which the sand 82 is drawn by the action of the pressure fluid. The mixture passes out through a fitting 84 which divides it between above mentioned pipes 40 and 42.

Fitting 84 as more particularly shown in FIG. 4 comprises a shell 86 having a collar portion 88 engaged as by threads to a nipple portion 90 on the lower portion of shell 38 so that reservoir 38 may be removed for recharging by merely unscrewing it out of fitting 84. Fitting 84 has nipples 92 and 94 for attachment of above-mentioned pipes 40 and 42. Fitting 84 also has a downwardly open portion 96 closed by a cap 98 for a purpose to appear.

Above mentioned nipple 90 on the lower portion of shell 38 is internally threaded or otherwise adapted to receive a plug 100 having a bore 102 receiving the lower end of tube 76 and normally closed by a plug 104, preferably of rubber or rubberlike material, having a frictional fit in bore 102, and which serves to seal the aggregate 82 in reservoir 38 and prevent the entrance of dampness. When reservoir 38 is pressurized, plug 104 is immediately blown out of bore 102 and takes the dotted position in FIG. 4, where it is out of the way of the stream of material going into pipes 40 and 42.

As stated, it is important that aggregate 82 be protected from dampness, and, to insure such protection a fragile diaphragm 106 is provided at the upper end of tube 76, which seals reservoir 38 before and while it is being installed on the aircraft. Diaphragm 106 is ruptured by the fluid pressure when the device is used and replaced when reservoir 38 is recharged. A second more rugged diaphragm 108 is installed, spaced above diaphragm 106 in neck 78 to protect diaphragm 106 from damage, and which is punctured by a pointed end portion 110 of pipe 36, portion 110 being forced down by a collar 112 threadedly engagable with nipple 78 and engaging a flange 114 on pipe 36. A port 116 opens out of the side of portion 110 to deliver the pressure fluid at the under side of the remains of diaphragm 108.

When the device has been used collar 112 is unscrewed and reservoir 38 is unscrewed out of fitting 84 and replaced with a fresh one which has been recharged at the service shop by removing plug 100, using due care to keep aggregate 82 perfectly dry. Plugs 100 and 104 are replaced, as well as diaphragms 106 and 108, whereupon the reservoir can be stored indefinitely without fear of the sand's becoming caked.

All that is necessary after the device has been used is to recharge tank 26, to replace reservoir 38 with a fresh one, and also to renew the seals on pipes 40 and 42 before the next take-off.

It is contemplated that the source of pressure fluid could be air bled from an appropriate point on the compressor portion of a jet-type engine, if the aircraft is so equipped.

It is to be noted that the flexibility of pipes 40 and 42 will provide for wheels 16 and 18 to be swung upwardly into the wings in well-known manner.

Figure 5:
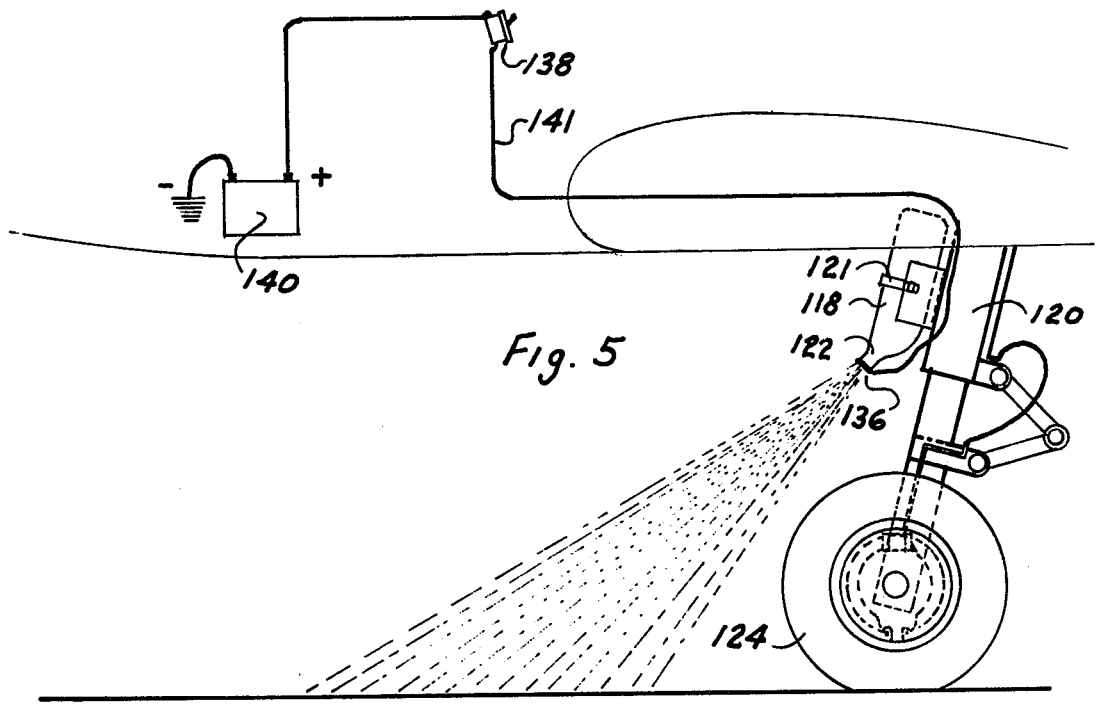
FIG. 5 is a left side elevation of an aircraft with parts ommitted showing the installation of a modified embodiment of the invention.
Figure 6:
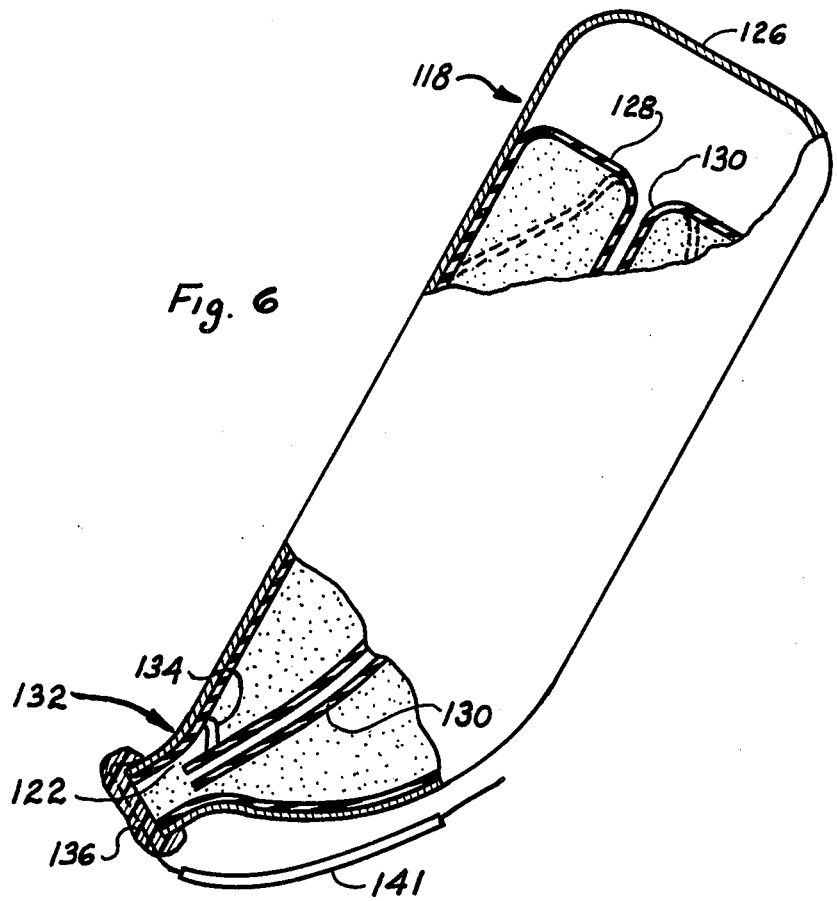
FIG. 6 is a partial vertical axial sectional view of the embodiment indicated in FIG. 5.

A modification of the invention is shown in FIGS. 5 and 6, in which a cartridge is removably fixed on a wheel strut 120 by a clamp 121, and has a lower opening 122 directed so as to project a mixture of sand and pressure fluid onto the runway in front of a wheel 124.

As more particularly shown in FIG. 6, cartridge 118 comprises an outer pressure resisting shell 126 within which is enclosed a rubber or rubber-like bladder or diaphragm 128 filled with gritty aggregate and having a center tubular portion 130 extending downwardly through the aggregate and terminating axially within a necked-down portion 132 of shell 126 and maintained in this position by a strut 134. Bladder 128 opens outwardly through neck portion 132 and is sealed by a fusible seal 136 of the type described in connection with FIGS. 1 and 3. Bladder 128 is spaced downwardly from the upper portion of shell 126, and the space is charged with pressure fluid such for example as "Freon" or some other suitable areosol propellant.

When the sand is needed a switch 138 is closed by the pilot and current from the plane's battery 140, carried by a wire 141 melts the seal 136 whereupon the pressure fluid discharging through tube 130 sprays the sand through neck portion 132 out in front of wheel 124. The proportions are so chosen that the discharge will persist for as long as it is likely to be needed. As the sand is used the bladder 128 will collapse as indicated in broken lines in FIG. 6.

It will be understood that there would be one of these cartridges for each landing wheel, and that they would be exhausted after use and readily replaced with fresh ones before the next take-off.

The operation of the device is thought to be clear from the foregoing, sufficient to say, the sand, when needed, is propelled by the pressure fluid into position to provide a gritty surface on the runway and that it is maintained in hermetically sealed condition until the moment of use to avoid any tendency of the sand to freeze or stick or otherwise to clog the passageways and nozzles.

What is claimed as new and desired to be secured by Letters Patent of the United States is:

1. In combination with an aircraft having a landing wheel, a system carried on the aircraft including a reservoir containing a quantity of gritty aggregate, a source of fluid under pressure, a nozzle portion in communication with the reservoir and positioned to discharge the aggregate in a region to be engaged between said landing wheel and the surface with which said wheel is in contact, said reservoir being separate from said source of fluid under pressure and having an outlet nipple portion, a fitting supported on the aircraft, said outlet nipple portion being removably engaged with said fitting, a draft tube extending through said reservoir and having an outlet terminating in said outlet nipple portion, a plug engaged in said outlet nipple portion and having a bore in which said draft tube is engaged, said fitting having a conduit receiving nipple, a conduit engaged with the last mentioned nipple and leading to the nozzle portion, a plug frictionally engaged in the bore of the first mentioned plug to seal said reservoir against the entrance of extraneous material, the last mentioned plug to be blown out of said bore when said reservoir is pressurized from said source of fluid under pressure, and said fitting having a portion positioned to receive the last mentioned plug when so blown out, and offset from the path of material coming from said draft tube and going into said conduit receiving nipple.

2. In combination with an aircraft having an landing wheel, a system carried on the aircraft including a reservoir containing a quantity of gritty aggregate, a source of fluid under pressure, a nozzle portion in communication with the reservoir and positioned to discharge the aggregate in a region to be engaged between said landing wheel and a surface with which said wheel is in contact, said source of fluid under pressure being separate from said reservoir containing said gritty aggregate, valve means controlling the flow of fluid from said source of fluid under pressure and a conduit connecting said valve means with said reservoir, said reservoir including an inlet having a coupling means for said conduit, and having a frangible diaphragm spaced from said conduit and positioned to seal said inlet against entrance of extraneous matter, and adapted to be ruptured by the pressure of fluid coming from said conduit.

3. A system as claimed in claim 2 including a second frangible diaphragm positioned to seal said inlet against entrance of extraneous matter and to protect the first mentioned diaphragm against damage during storage and handling, and said conduit having a portion positioned to puncture said second frangible diaphragm during the operation of said coupling means in the act of coupling said conduit to said reservoir.

4. A device according to claim 2 in which said reservoir has a draft tube extending lengthwise through said reservoir and in communication with said conduit, said draft tube having a constricted venturi portion and being in communication with said nozzle portion, and said venturi portion having an opening communicating with the interior of said reservoir for passage of gritty aggregate into said venturi portion by the action of pressure fluid in said reservoir and flowing through said venturi portion.

5. In combination with an aircraft having a landing wheel, a system carried on the aircraft including a reservoir containing a quantity of gritty aggregate, a source of fluid under pressure, a nozzle portion in communication with the reservoir and positioned to discharge the aggregate in a region to be engaged between said landing wheel and a surface with which said wheel is in contact, means sealing said nozzle portion against passage of fluent material, and means for disabling the sealing means at will for discharge of said aggregate, said reservoir containing a rubber-like bladder substantially filling said reservoir and containing said gritty aggregate, said bladder having a portion substantially contiguous with said nozzle portion and forming an opening for the discharge of said aggregate, said bladder having a draft tube extending from the region of said reservoir removed from said bladder, through said bladder and terminating within the opening of said bladder.

* * * * *